UNITED STATES PATENT OFFICE 2,438,038

METHOD OF REMOVING PAINT, VARNISH, AND LACQUER FILMS FROM SURFACES

John Kenneth Craver, Webster Groves, Mo., assignor to Monsanto Chemical Company, St. Louis, Mo., a corporation of Delaware No Drawing. Application October 2, 1944,
Serial No. 556,894

2 Claims. (Cl. 252—170)

This invention relates to paint, varnish and lacquer removing compositions and in particular to a novel composition for that purpose.

The paint, varnish and lacquer removing compositions commonly employed generally contain water-immiscible, volatile and highly inflammable organic solvents such as benzene and toluene. Acetone may also be a constituent of such compositions. The vapors which are evolved during the use of such compositions are irritating to the mucous membranes, and the liquids contained in the compositions are injurious to the skin and have disagreeable odors. These compositions usually contain paraffin wax or other waxes for the purpose of retaining the volatile active ingredients on the painted surface during the paint softening operation. The removal of the softened paint from wood surfaces by scraping or other means tends to leave a residue of wax on the wood articles from which the coating is being removed. This wax film is not readily removed by water and frequently resists complete removal by means of gasoline or similar solvent. This wax residue is frequently responsible for poor adhesion of the new paint subsequently applied to the surface. Moreover, the new paint film tends to stay sticky and to resist hardening in the presence of the wax film.

One of the objects of the present invention is to provide a novel paint, varnish and lacquer removing composition which is characterized by the absence of waxes and other normally solid or semi-solid constitutents.

Another object is to provide a novel paint, varnish and lacquer removing composition which is characterized by non-inflammability and water miscibility.

A further object is to provide a novel paint, varnish and lacquer removing composition which is characterized by freedom from mucous membrane and skin irritating components.

Other objects will become apparent from the following description and examples.

The novel composition of the present invention, generally stated, comprises a liquid composition having as an active constituent gamma-valerolactone, or gamma-butyrolactone or a mixture of these substances. The composition may be an aqueous solution of gamma-valerolactone or gamma-butyrolactone containing from 10 to 98% of this material. The preferred proportions for the purpose of paint, varnish and lacquer removal are 50 parts of gamma-valerolactone or gamma-butyrolactone and 50 parts of water, although compositions containing as little as 10% or less and as much as 98% or more of gamma-valerolactone or gamma-butyrolactone are capable of removing paint, varnish and lacquer coatings from wood and metal surfaces. The resulting solutions possess relatively low surface tension and a pH of approximately 4, and the aqueous solutions are non-inflammable. Gamma-valerolactone and gamma-butyrolactone are stable at temperatures from —30° C. and lower to 150° C. and higher. The composition has been found to possess the property of softening paint, varnish and lacquer films to the extent that these softened films may be removed readily by any suitable method, for example, by scraping the surface with a scraping tool, or rubbing the surface with steel wool. The residual composition may then be readily removed by washing the treated surface with clean water. The resulting surface is then allowed to dry. Any residual water or gamma-valerolactone volatilizes from the surface in a relatively short time, for example from ½ to 2 hours, depending upon atmospheric conditions such as temperature and humidity. The drying operation may be accelerated by the application of heat or hot air to the washed surface after the paint has been removed.

Alternative embodiments of the composition of the present invention are contemplated within the scope of the present invention. For example, wetting agents such as alkyl benzene sulfocarboxylic acids having alkyl residues containing 8 to 18 carbon atoms may be incorporated in the composition. Other wetting agents such as glycol mono-stearate, glycol monooleate and sodium lauryl sulfonate may be incorporated in the composition in any amount desired. Also, other paint removing components may be incorporated, for example, oxalic acid and lactic acid. In addition, water-immiscible organic solvents, such as, methylene dichloride, ethylene dichloride, tetrachloro ethylene, and the butyl ether of ethylene glycol, and water-miscible organic solvents, such as, acetone, methyl alcohol, ethyl alcohol and isopropyl alcohol, may be used in place of all or part of the water content of the composition. Benzene or toluene may also be employed, preferably in amounts insufficient to render the resulting composition inflammable. However, the desirable properties of the aqueous solution of gamma-valerolactone or of gamma-butyrolactone are desirably retained by avoiding the use of inflammable, irritating and water-immiscible substances wherever possible as components of the composition. None of these other substances have been found to be absolutely essential as components of the present composition and are described merely for the purpose of illustrating some of the modifications of the composition of the present invention which are contemplated as being within the scope of this invention. Some of these substances possess to a limited extent the property of accelerating the rate of softening of the paint, varnish or lacquer film which is to be removed.

The novel composition of the present invention has been found to be effective in the removal of aged paint, varnish or lacquer films, baked films of lacquer, enamel or resin coatings and newly applied or partially aged films. The composition is applicable to the treatment of both metal and wood surfaces, as well as to the removal of paint, lacquer and varnish from other substances, for example, wool, cotton waste and textiles. The composition has been found effective for the removal of all types of paints, lacquers, enamels and varnishes with the exception of some baked urea aldehyde films. Among the types of coatings removed from metal and wood surfaces by means of the composition of the present invention are those containing cellulose esters, such as cellulose nitrate and cellulose acetate; cellulose ethers such as ethyl cellulose; phenol aldehyde resin coatings; varnishes including those containing rubber; paints formulated with white lead, barium sulfate, zinc sulfide or titanium oxide pigments and various oils such as linseed oil, tung oil, oiticica oil and others; vinyl resin, melamine resin, methylol melamine resin and methylol urea resin coatings both air-dried and baked.

The following examples will serve to illustrate the composition of the present invention and its application in the removal of films or coatings. These examples are to be construed as merely illustrative and not as limiting the scope of this invention or the embodiments which fall within the scope of the present invention.

*Example I*

|  | Parts by weight |
|---|---|
| Gamma-valerolactone | 50 |
| Water | 50 |

This composition was applied to a six months' old white lead base oil paint film on a wood slab by means of a piece of cotton waste. After three minutes the paint film had been softened to the extent that substantially the entire film could be removed readily by means of a scraper. The scraped surface was then washed with clear water, wiped dry with cotton waste and allowed to stand in the air for several hours. A fresh coat of white lead paint was then applied to the surface. The new paint dried readily and was found to adhere firmly to the wood. Moreover, the dried paint surface was found to be hard and free from tackiness. By substituting gamma-butyrolactone for gamma-valerolactone in the aforedescribed composition, and treating another specimen of the painted wood slab, substantially the same satisfactory results were obtained.

*Example II*

|  | Parts by weight |
|---|---|
| Gamma-valerolactone | 80 |
| Water | 20 |

This composition was applied to a two year old varnish film on a wood slab by pouring a portion of the composition on the slab and distributing this portion over the surface with a piece of cotton waste. After three to four minutes a large portion of the old varnish was sufficiently soft to be removed by means of a scraper. The residual varnish film was treated with an additional quantity of the composition. The balance of the film was readily removed from the wood in a few minutes by means of a scraper. The wood surface was then washed with clear water, wiped with cotton waste and allowed to stand for several hours. A fresh coat of varnish was applied to the surface and allowed to dry. The new film was entirely satisfactory. Identical results were obtained with a composition in which the gamma-valerolactone was substituted by gamma-butyrolactone.

*Example III*

The composition of the present invention was found to be particularly satisfactory for the removal of nail lacquer from the finger-nails and toe-nails. For this purpose, a 50:50 ratio of gamma-valerolactone and water was found to be very satisfactory, although lower concentrations, for example 10 to 20% solutions of gamma-valerolactone in water, were also satisfactory. The composition was applied by means of a piece of cleansing tissue, and the lacquer coat on the nails was readily removed with a slight rubbing action. The residue of the composition on the nails and adjoining skin after removal of the lacquer was readily removed merely by washing the hands in clear water. The odor of the composition was not objectionable, and the composition was found to be non-irritating to the cuticle and surrounding skin. There were no apparent signs of local or systemic injury to the cuticle or adjacent skin. Substituting gamma-butyrolactone for gamma-valerolactone in the same proportion, substantially the same satisfactory results were obtained.

*Example IV*

To each of the two compositions of Example II was added 1% of dodecyl benzene sulfonic acid. The composition was applied according to the procedure described in Example II to boiled linseed oil films which had been baked on wood slabs at 110° C. for 24 hours. The cleaned and dried surfaces were then coated with fresh films of oil paint. The results were entirely satisfactory.

*Example V*

|  | Parts by weight |
|---|---|
| Gamma-valerolactone | 20 |
| Gamma-butyrolactone | 20 |
| Isopropyl alcohol | 20 |
| Water | 40 |

The solution resulting from the admixture of these substances was applied to paint, lacquer and varnish surfaces on wood and metal articles and on finger-nails, and was found to soften the films or coatings to the extent that the coatings were readily removable with a scraper. Residues of coatings were then readily removed by washing the treated objects with clear water.

*Example VI*

|  | Parts by weight |
|---|---|
| Gamma-butyrolactone | 40 |
| Ethyl alcohol | 20 |
| Water | 39 |
| Glycol mono-oleate | 1 |

The components were mixed in the order given, and the resulting composition was a clear solution. This composition was applied to a baked phenol aldehyde resin coating on metal parts, using the procedure described in Example I. The coating was softened in 3 to 4 minutes and was readily removed by scraping the surface. The scraped surface was then washed with clear water and dried. A fresh coating of the resin was applied to the metal parts, and the coating was dried and baked in the usual manner. The new coating was found to adhere firmly with no tendency to lift or to become soft and tacky.

The novel composition of the present invention possesses a number of advantages over the usual paint, varnish and lacquer removing compositions. In particular, the composition is non-inflammable and free from irritating effects on the skin or mucous membranes. In addition, the composition is readily removed by means of water. Moreover, the composition has substantially no tendency to stain wood.

I claim:

1. A process for the removal of paint, varnish and lacquer films from surfaces bearing said films comprising applying to said surfaces an aqueous solution consisting essentially of water and 40–80% of a substance selected from the group consisting of gamma-valerolactone and gamma-butyrolactone, allowing said solution to remain on said surface until said film is loosened, removing the loosened film by mechanical means and removing any remaining residue by washing said surface with water.

2. A process for the removal of paint, varnish and lacquer films from surfaces bearing said films comprising applying to said surfaces an aqueous solution consisting of water, a wetting agent and 40–80% of a substance selected from the group consisting of gamma-valerolactone and gamma-butyrolactone, allowing said solution to remain on said surface until said film is loosened, removing the loosened film by mechanical means and removing any remaining residue by washing said surface with water.

JOHN KENNETH CRAVER.

REFERENCES CITED

The following references are of record in the file of this patent:

UNITED STATES PATENTS

| Number | Name | Date |
| --- | --- | --- |
| 1,118,482 | Ellis | Nov. 24, 1914 |
| 2,122,719 | Kreimeier | July 5, 1938 |
| 2,317,505 | Wassell | Apr. 25, 1943 |

OTHER REFERENCES

Hackh's Chemical Dictionary, Grant, 2d ed., 1937, page 980.

Handbook of Chemistry and Physics, Chem. Rubber Pub. Co., 26th ed., pages 1054–55.